United States Patent
Horng et al.

(10) Patent No.: US 6,462,441 B1
(45) Date of Patent: Oct. 8, 2002

(54) ROTOR ASSEMBLY OF BRUSHLESS DIRECT CURRENT MOTOR

(75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/781,974

(22) Filed: Feb. 14, 2001

(51) Int. Cl.[7] .................... H02K 11/00; H02K 7/00; H02K 21/12

(52) U.S. Cl. ............... 310/67 R; 310/156.32; 310/66

(58) Field of Search ................ 310/67 R, 66, 310/40 R, 10, 156.32–156.37, 156.01, 152, 90

(56) References Cited

U.S. PATENT DOCUMENTS

| | | | | |
|---|---|---|---|---|
| 2,953,417 A | * | 9/1960 | Horberg .................... 384/517 |
| 3,164,097 A | * | 1/1965 | Nicoll ....................... 417/357 |
| 3,786,290 A | * | 1/1974 | Papst et al. ............... 310/67 R |
| 3,804,562 A | * | 4/1974 | Hansson .................... 384/517 |
| 4,564,335 A | * | 1/1986 | Harmsen et al. .......... 415/218.1 |
| 4,686,400 A | * | 8/1987 | Fujisaki et al. .......... 310/156.05 |
| 4,891,537 A | * | 1/1990 | Shiraki et al. ........... 310/156.32 |
| 5,000,589 A | * | 3/1991 | Ogata et al. ................ 384/517 |
| 5,559,382 A | * | 9/1996 | Oku et al. ................ 310/67 R |
| 5,571,004 A | * | 11/1996 | Masters et al. ............ 418/107 |
| 5,635,781 A | * | 6/1997 | Moritan ..................... 310/254 |
| 5,705,917 A | * | 1/1998 | Scott et al. ............. 310/156.21 |
| 5,739,614 A | * | 4/1998 | Suzuki et al. ............... 310/180 |
| 5,744,882 A | * | 4/1998 | Teshima et al. ........... 310/67 R |
| 5,770,908 A | * | 6/1998 | Kim ....................... 310/156.32 |
| 5,834,866 A | * | 11/1998 | Fujitani et al. ............. 310/162 |
| 5,850,318 A | * | 12/1998 | Dunfield et al. .......... 360/98.07 |
| 5,875,067 A | * | 2/1999 | Morris et al. ............. 360/97.01 |
| 5,877,567 A | * | 3/1999 | Moritan ...................... 310/254 |
| 5,883,449 A | * | 3/1999 | Mehta et al. ................ 310/42 |
| 5,925,948 A | * | 7/1999 | Matsumoto ................. 310/216 |
| 5,942,820 A | * | 8/1999 | Yoshida .................... 310/67 R |
| 5,949,165 A | * | 9/1999 | Sakuragi ................... 310/67 R |
| 5,982,064 A | * | 11/1999 | Umeda et al. ................ 310/61 |
| 6,172,442 B1 | * | 1/2001 | Jun ........................ 310/156.32 |
| 6,181,033 B1 | * | 1/2001 | Wright ................. 310/40 MM |
| 6,186,739 B1 | * | 2/2001 | Hsieh ....................... 415/213.1 |
| 6,250,884 B1 | * | 6/2001 | Huang ....................... 416/207 |
| 6,315,031 B1 | * | 11/2001 | Miyahara et al. ........... 165/121 |
| 6,315,529 B1 | * | 11/2001 | Hu ........................... 417/423.1 |
| 6,396,178 B1 | * | 5/2002 | Chiu ........................ 310/67 R |
| 6,400,524 B1 | * | 6/2002 | Morris et al. ............. 360/97.01 |

* cited by examiner

*Primary Examiner*—Nestor Ramirez
*Assistant Examiner*—Pedro J. Cuevas
(74) *Attorney, Agent, or Firm*—Bacon & Thomas

(57) ABSTRACT

A rotor assembly of a brushless direct current motor includes a body provided with a circuit board, a pole plate, a coil, and a shaft base. The shaft base is provided with a positioning hole having a threaded portion by which a fixing member can be combined with a rotor. The rotor is provided with a countersunk seat in which a bearing is placed. The bearing has an axial hole for allowing passage of the fixing member so as to fix it. The rotor takes the fixing member as a center so as to rotate by a permanent magnet inducing with the coil.

8 Claims, 6 Drawing Sheets

ROTOR ASSEMBLY OF BRUSHLESS DIRECT CURRENT MOTOR

BACKGROUND OF THE INVENTION

1. Field of the Invention

The present invention relates to a rotor assembly of a brushless direct. current motor, wherein the rotor can be conveniently assembled and fixed.

2. Description of the Related Prior Art

A conventional brushless direct current motor of axial winding radial air gap in accordance with the prior art shown in FIG. 6 comprises a metallic axle tube 91 combined on a housing 90. The metallic axle tube 91 has an outer diameter combined with a circuit board 92, a coil 93, and pole plates 94. The metallic axle tube 91 has an inner diameter for combination with an oil-impregnated bearing 95 or a positioning bushing and a ball bearing, and a rotor has a magnet ring 96 to induce with the coil 93 to rotate.

During assembly of the conventional brushless direct current motor, it takes a lot of time to assemble the metallic axle tube 91 with the circuit board 92, the coil 93, the pole plates 94, and the oil-impregnated bearing 95. In addition, it needs a proper tightness between the metallic axle tube 91 and the circuit board 92, the coil 93, the pole plates 94, and the oil-impregnated bearing 95, thereby causing inconvenience in fabrication and assembly.

SUMMARY OF THE INVENTION

The objective of the present invention is to provide a rotor assembly of a brushless direct current motor, wherein the rotor can be conveniently assembled so that the brushless direct current motor can be manufactured and assembled more easily.

The present invention essentially includes a body provided with a circuit board, a pole plate, a coil, and a shaft base. The shaft base is provided with a positioning hole having a threaded portion by which a fixing member can be combined with a rotor. The rotor is provided with a countersunk seat in which a bearing is placed. The bearing has an axial hole for allowing passage of the fixing member so as to fix it. The rotor takes the fixing member as a center so as to rotate by a permanent magnet inducing with the coil.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
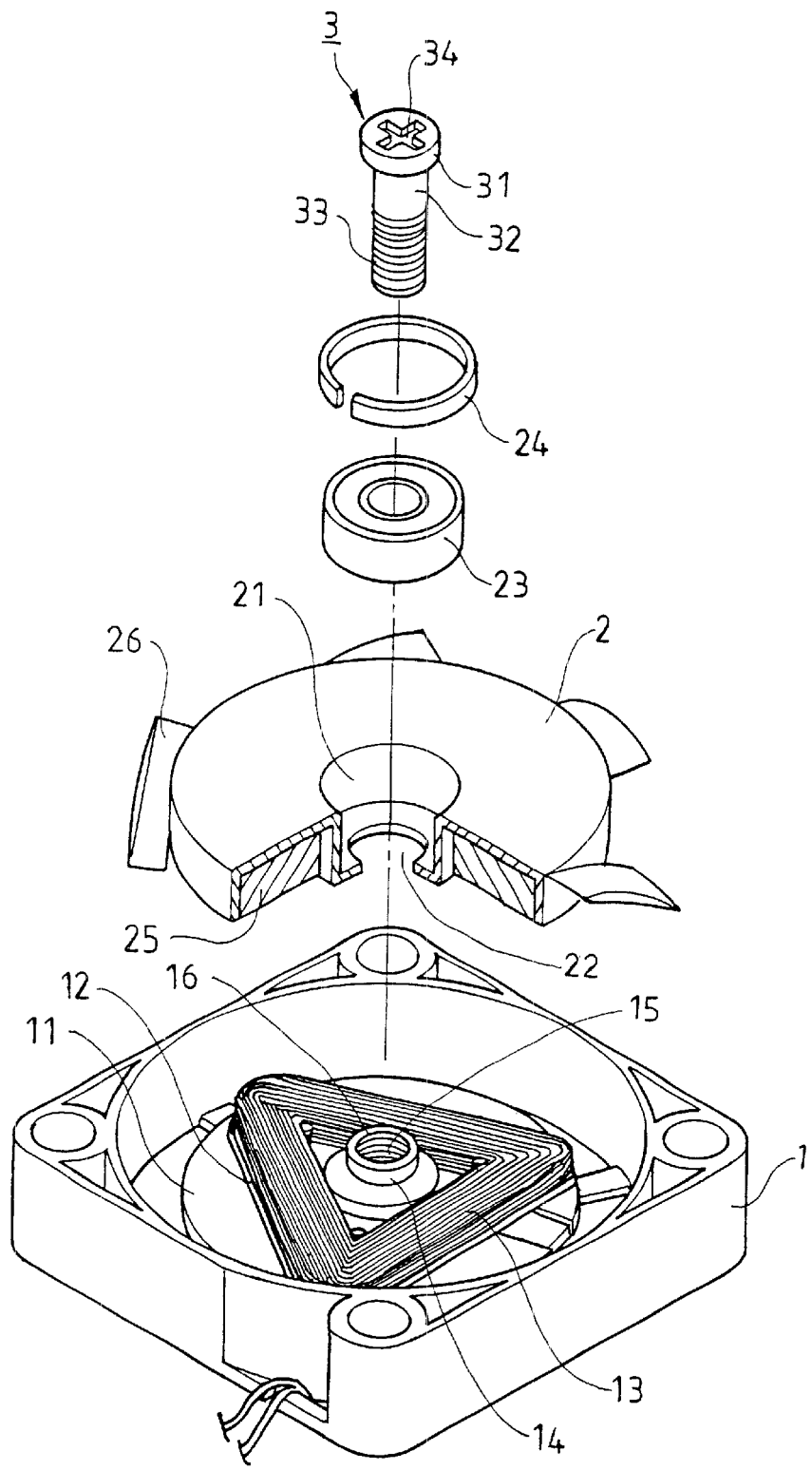
FIG. 1 is an exploded perspective view of a rotor assembly of a brushless direct current motor in accordance with a first embodiment of the present invention.
Figure 2:
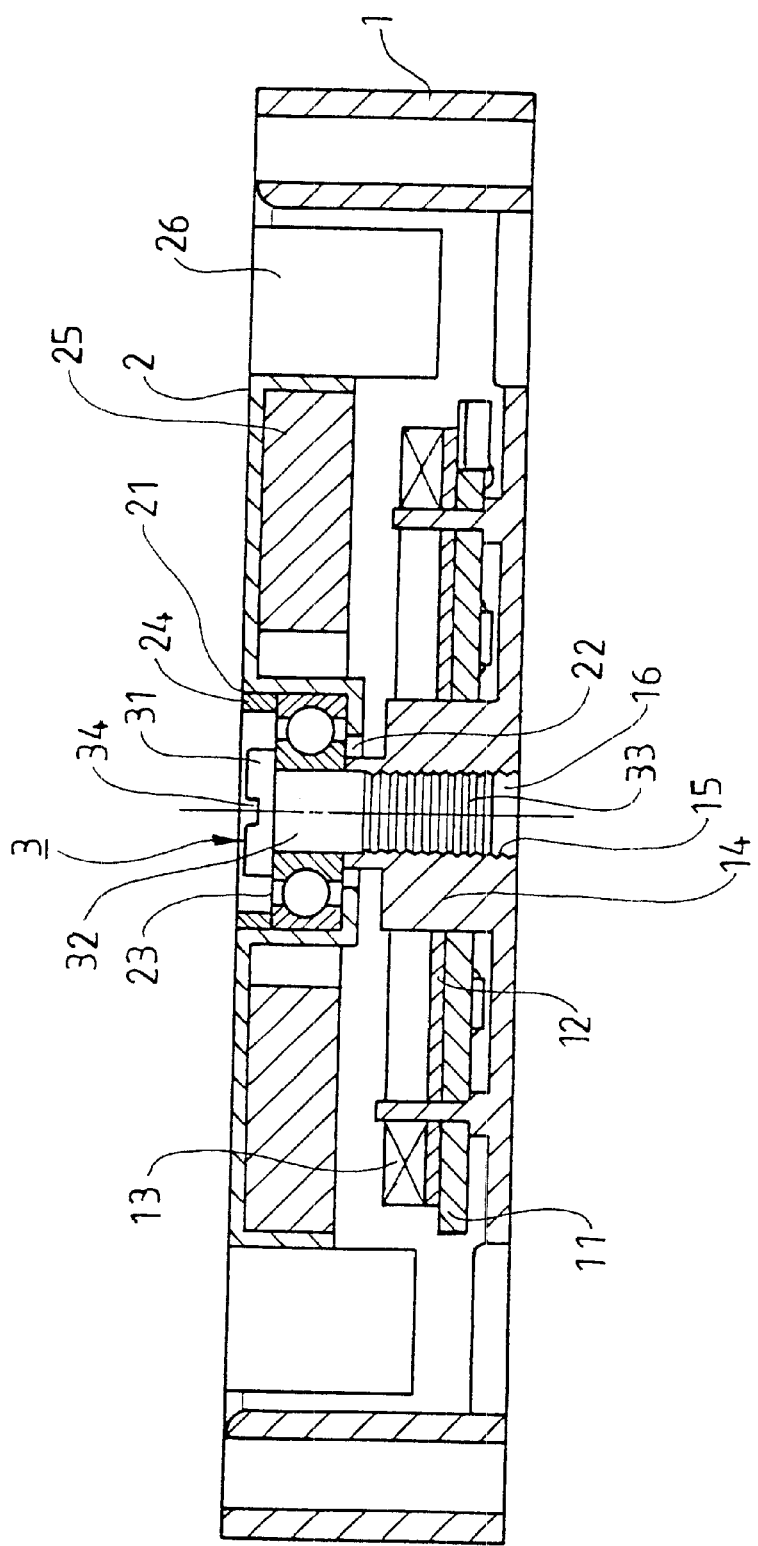
FIG. 2 is a front plan cross-sectional assembly view of the rotor assembly of a brushless direct current motor as shown in FIG. 1.

Referring to FIGS. 1 and 2, a first preferred embodiment of the present invention is shown, wherein the embodiment is used in axial winding axial air gap. The rotor assembly of a brushless direct current motor essentially comprises a body 1, a rotor 2, and a fixing member 3.

The body 1 can be the housing of a conventional heat radiating fan. The body 1 is combined with a circuit board 11, a pole plate 12, a coil 13, and a shaft base 14, and the shaft base 14 defines a positioning hole 16 having a threaded portion 15. In the preferred embodiment, the threaded portion 15 is located in the inner wall of the positioning hole 16 which is provided for combining with the fixing member 3.

The rotor 2 can be the impeller of a conventional heat radiating fan. The rotor 2 is provided with a countersunk seat 21 at the central position thereof. The countersunk seat 21 defines a through hole 22. A bearing 23 is mounted in the countersunk seat 21. The bearing 23 is fixed by a retaining member 24 such as a C-shaped ring after being placed in the countersunk seat 21 of the rotor 2. The through hole 22 allows passage of the fixing member 3 that is rotatably mounted in the bearing 23. The rotor 2 itself is provided with conventional parts such as a permanent magnet 25, and a blade 26.

The fixing member 3 is formed with the shape of a bolt shank, and includes a cap head 31 having a diameter greater than that of the shank. The shank includes a pivot portion 32 and a threaded portion 33, wherein the pivot portion 32 is provided for combination with the bearing 23, and the threaded portion 33 may be combined with the threaded portion 15 provided in the positioning hole 16 of the body 1. For facilitating the rotation of the fixing member 3, the top end face of the cap head 3 of the fixing member 3 may be provided with an "1" shaped or a cross-shaped slot 34. Therefore, when the fixing member 3 passes through the bearing 23 that is fixed in the countersunk seat 21 provided on the rotor 2, the fixing member 3 can be rotated so as to fit the rotor 2 on the body 1. The threading of the fixing member 3 can be adapted to has the same direction as that of the rotation of the rotor 2, or an adhesive can be coated on the fixing member 3 and the threaded portion 15, thereby preventing detachment of the fixing member 3.

Figure 3:
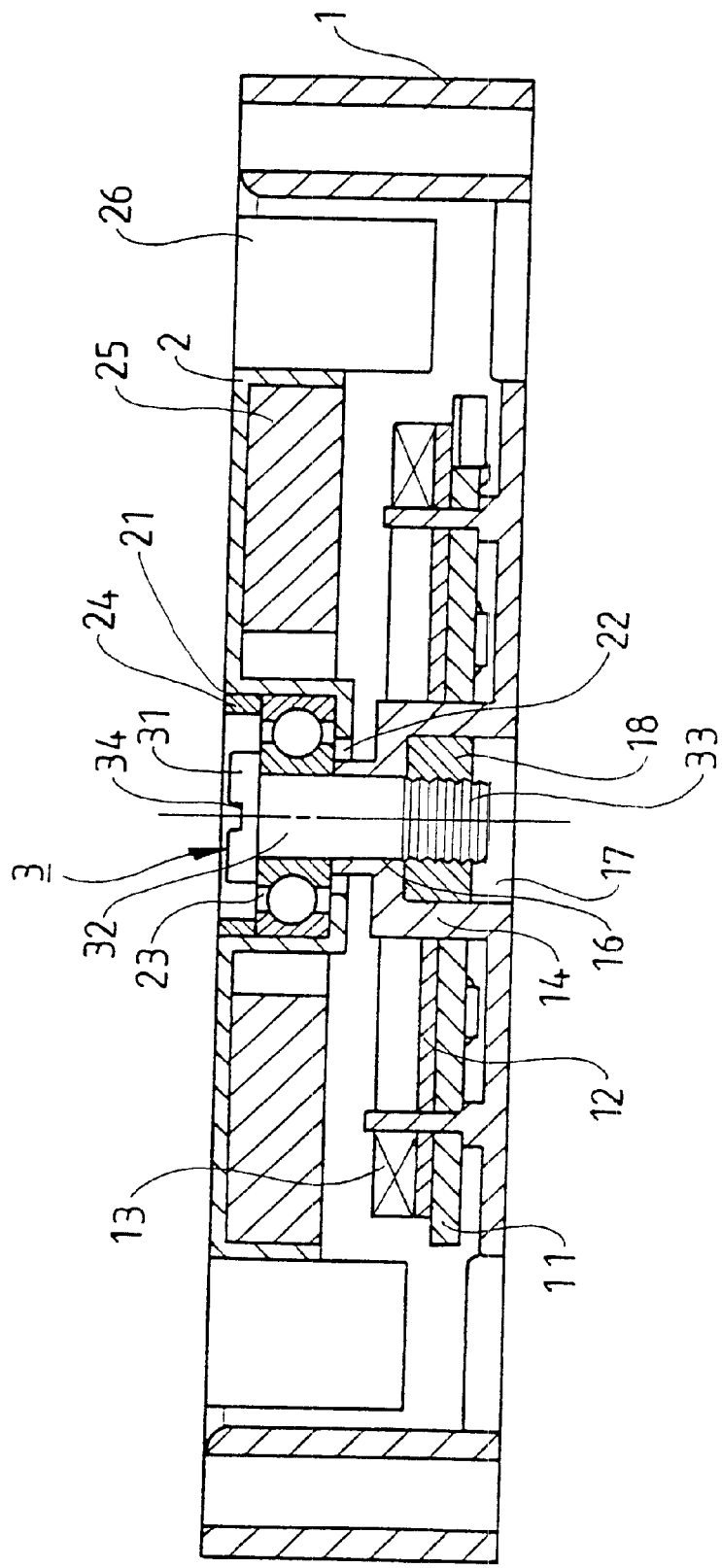
FIG. 3 a front plan cross-sectional assembly view of a rotor assembly of a brushless direct current motor in accordance with a second embodiment of the present invention.

Referring to FIG. 3, a second preferred embodiment of the present invention is shown. The shaft base 14 of the body 1 is provided with a fitting hole 17 that is concentric with the positioning hole 16. The fitting hole 17 is provided for receiving a nut 18 therein, and the nut 18 can be combined with the fixing member 3 by rotation. The threading of the fixing member 3 can be adapted to has the same direction as that of the threading of the nut 18, or an adhesive can be coated on the fixing member 3 and the nut 18, thereby preventing detachment of the fixing member 3.

Figure 4:
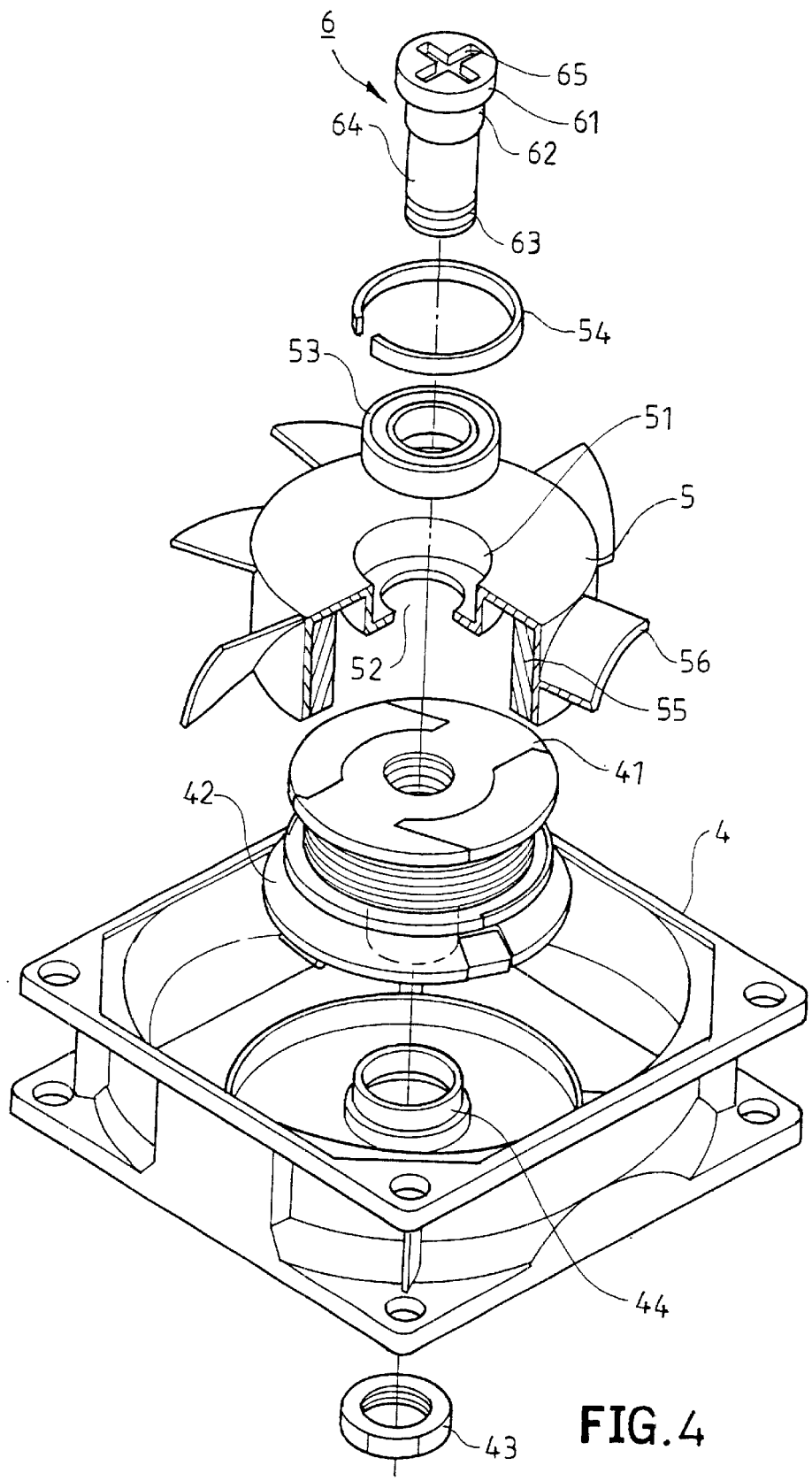
FIG. 4 is an exploded perspective view of a rotor assembly of a brushless direct current motor in accordance with a third embodiment of the present invention.
Figure 5:
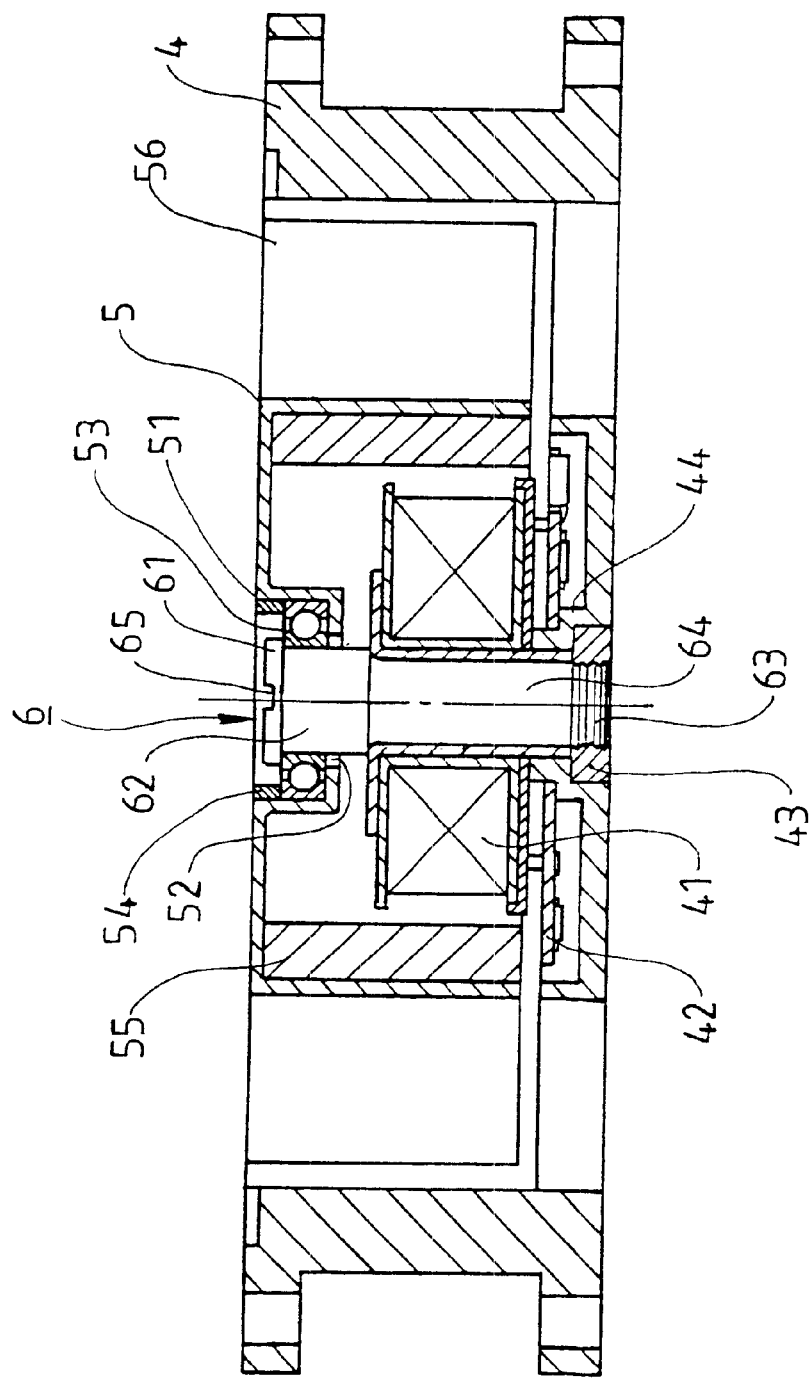
FIG. 5 is a front plan cross-sectional assembly view of the rotor assembly of a brushless direct current motor as shown in FIG. 4.
Figure 6:
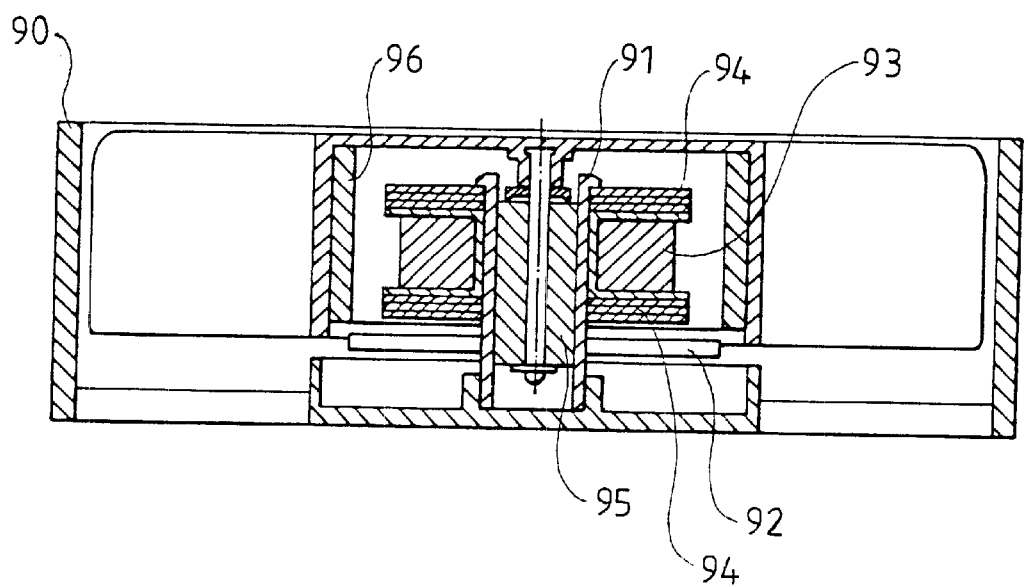
FIG. 6 is a front plan cross-sectional assembly view of a conventional brushless direct current motor in accordance with the prior art.

Referring to FIG. 4, a third preferred embodiment of the present invention is shown, wherein the embodiment is used in axial winding radial air gap. The rotor assembly of a brushless direct current motor comprises a body 4, a rotor 5, and a fixing member 6.

The body 4 can be the housing of a conventional heat radiating fan. The body 4 is provided with a column 44. The column 44 has an outer diameter fitted with a stator base 41 and a circuit board 42. The column 44 has an inner diameter for allowing passing and fixing of the fixing member 6. The inner wall of the column 44 can be provided with a threaded portion to mate with the fixing member 6, or as shown in the figure, the inner diameter of the column 44 is formed with a stepped ring for receiving therein a positioning member 43, such as a nut, to combine with the fixing member 6 by rotation.

The rotor 5 can be the impeller of a conventional heat radiating fan. The rotor 5 is provided with a countersunk seat 51 at the central position thereof. The countersunk seat 51 defines a through hole 52. A bearing 53 is mounted in the countersunk seat 51, and is fixed in place by a retaining ember 54 such as a C-shaped ring. The through hole 52 allows passage of the fixing member 6 that is rotatably mounted in the bearing 53. The rotor 5 itself is provided with conventional parts such as a permanent magnet 55, and a blade 56.

The fixing member 6 is formed with the shaped of a bolt shank and has a cap head 61 with a diameter greater than that of the shank. The shank includes a pivot portion 62, a combination portion 64, and a threaded portion 63, wherein the pivot portion 62 is provided for combination with the bearing 53, the threaded portion 63 can be combined with the threaded portion provided on the column 44 of the body 2 or combined with the positioning member 43, and the combination portion 64 can be used to combine with the stator base 41. For facilitating the rotation of the fixing member 6, the top end face of the cap head 61 of the fixing member 6 may be provided with an "1" shaped or a cross-shaped slot 65. Therefore, when the fixing member 6 passes through the bearing 53 that is fixed in the countersunk seat 51 provided on the rotor 5, the fixing member 6 can be rotated so as to fit the rotor 5 on the body 4. The threading of the fixing member 6 can be adapted to has the same direction as that of the rotation of the rotor 5, or fixed by an adhesive, thereby preventing detachment of the fixing member 6.

Effect of the Present Invention

In accordance with the brushless direct current motor of the present invention, the rotor can be conveniently assembled simply by placing the bearing in the countersunk seat of the rotor, and fixing the rotor on the shaft seat of the body by the fixing member. In general, the present invention has the effects of convenient and rapid assembly.

Although the invention has been explained in relation to its preferred embodiment as mentioned above, it is to be understood that many other possible modifications and variations can be made without departing from the scope of the present invention. It is, therefore, contemplated that the appended claim(s) will cover such modifications and variations that fall within the true scope of the invention.

What is claimed is:

1. A rotor assembly of a brushless direct current motor comprising:
    a body having a circuit board, a pole plate, a coil, and a shaft base, the shaft base defining a fitting hole for receiving a nut therein;
    a rotor provided with a countersunk seat, the countersunk seat defining a through hole, a bearing mounted in the countersunk seat, the rotor itself having a permanent magnet; and
    a fixing member formed with the shaped of a bolt shank and having a cap head with a larger diameter, the shank itself having a pivot portion combined on the bearing, and a threaded portion combined with the nut placed in the fitting hole of the body.

2. The rotor assembly of a brushless direct current motor as claimed in claim 1, wherein the bearing is fixed by a retaining member after being placed in the countersunk seat of the rotor.

3. The rotor assembly of a brushless direct current motor as claimed in claim 1, wherein the rotor is provided with a blade.

4. The rotor assembly of a brushless direct current motor as claimed in claim 1, wherein the body is the housing of a heat radiating fan.

5. A rotor assembly of a brushless direct current motor comprising:
    a body provided with a column, the column having an outer diameter fitted with a stator base and a circuit board, the column having an inner diameter formed with a stepped ring for receiving a positioning member therein;
    a rotor provided with a countersunk seat, the countersunk seat defining a through hole, a bearing mounted in the countersunk seat, the rotor itself having a permanent magnet; and
    a fixing member formed with the shaped of a bolt shank and having a cap head with a larger diameter, the shank itself having a pivot portion combined on the bearing, a combination portion combined with the stator base, and a threaded portion combined with the positioning member placed in the column of the body.

6. The rotor assembly of a brushless direct current motor as claimed in claim 5, wherein the bearing is fixed by a retaining member after being placed in the countersunk seat of the rotor.

7. The rotor assembly of a brushless direct current motor as claimed in claim 5, wherein the rotor is provided with a blade.

8. The rotor assembly of a brushless direct current motor as claimed in claim 5, wherein the body is the housing of a heat radiating fan.

* * * * *